United States Patent [19]
Miller

[11] Patent Number: 5,915,710
[45] Date of Patent: Jun. 29, 1999

[54] HUMAN POWERED VEHICLE

[76] Inventor: Donald C. Miller, 2018 Winterwarm Rd., Fallbrook, Calif. 92028

[21] Appl. No.: 08/795,305

[22] Filed: Feb. 4, 1997

[51] Int. Cl.⁶ .................................................. B62M 1/04
[52] U.S. Cl. ...................................... 280/252; 280/288.1
[58] Field of Search ................................... 280/252, 253, 280/254, 255, 258, 288.1, 288.4, 304.3, 304.4

[56] References Cited

U.S. PATENT DOCUMENTS

| | | |
|---|---|---|
| 556,802 | 3/1896 | Boyle . |
| 566,838 | 9/1896 | Boyle . |
| 719,595 | 2/1903 | Huss ........................................ 280/252 |
| 846,033 | 3/1907 | Kidney . |
| 2,002,046 | 5/1935 | Scholtes .................................. 280/252 |
| 2,023,889 | 12/1935 | Kramps .................................... 280/252 |
| 3,891,235 | 6/1975 | Shelly ...................................... 280/252 |
| 4,019,230 | 4/1977 | Pollard .................................... 280/214 |
| 4,169,609 | 10/1979 | Zampidro ................................ 280/241 |
| 4,227,712 | 10/1980 | Dick ........................................ 280/236 |
| 4,248,448 | 2/1981 | Dmitrowaky ........................... 280/261 |
| 4,411,443 | 10/1983 | Pollard .................................. 280/288.1 |
| 4,647,060 | 3/1987 | Tomkinson ........................... 280/288.1 |
| 4,666,173 | 5/1987 | Graham .................................. 280/255 |
| 4,953,882 | 9/1990 | Craig, Jr. ................................ 280/258 |
| 4,978,167 | 12/1990 | Harvey ................................ 280/288.4 |
| 4,986,556 | 1/1991 | Hartmann . |
| 5,121,654 | 6/1992 | Fasce ...................................... 74/994.2 |
| 5,156,412 | 10/1992 | Meguerditchian ...................... 280/241 |
| 5,236,211 | 8/1993 | Meguerditchian ...................... 280/241 |
| 5,242,181 | 9/1993 | Fales et al. .............................. 280/254 |
| 5,242,182 | 9/1993 | Bezerra et al. ......................... 280/253 |
| 5,290,054 | 3/1994 | Po ......................................... 280/288.1 |
| 5,326,122 | 7/1994 | Duffy .................................... 280/288.4 |
| 5,383,677 | 1/1995 | Thomas et al. ....................... 280/288.4 |
| 5,496,051 | 3/1996 | Farmos .................................. 280/252 |
| 5,732,963 | 3/1998 | White .................................... 280/252 |

*Primary Examiner*—Kevin Hurley
*Attorney, Agent, or Firm*—Calif Tervo

[57] ABSTRACT

A human powered vehicle comprises a frame supporting a rider in a substantially horizontal position, a driven wheel rotatably mounted on the frame, a drive gear for driving the driven wheel, left and right pedals mounted on the frame, the pedals reciprocally traveling in a substantially horizontal, rectilinear path, and a transmission connecting each pedal with the driven wheel for converting the rectilinear motion of the pedals into rotary motion for propelling the driven wheel. In a first exemplary embodiment, each pedal includes a rack and each transmission includes a pinion gear engaged with the rack. In a second exemplary embodiment, a drive belt connects each pedal and to the drive gear. The pedals are connected by that drive belt or another belt such that the pedals move simultaneously but in opposite directions In a third exemplary embodiment, each pedal is connected by a connecting rod to crank arm on the crank of a conventional crank driven bicycle.

20 Claims, 4 Drawing Sheets

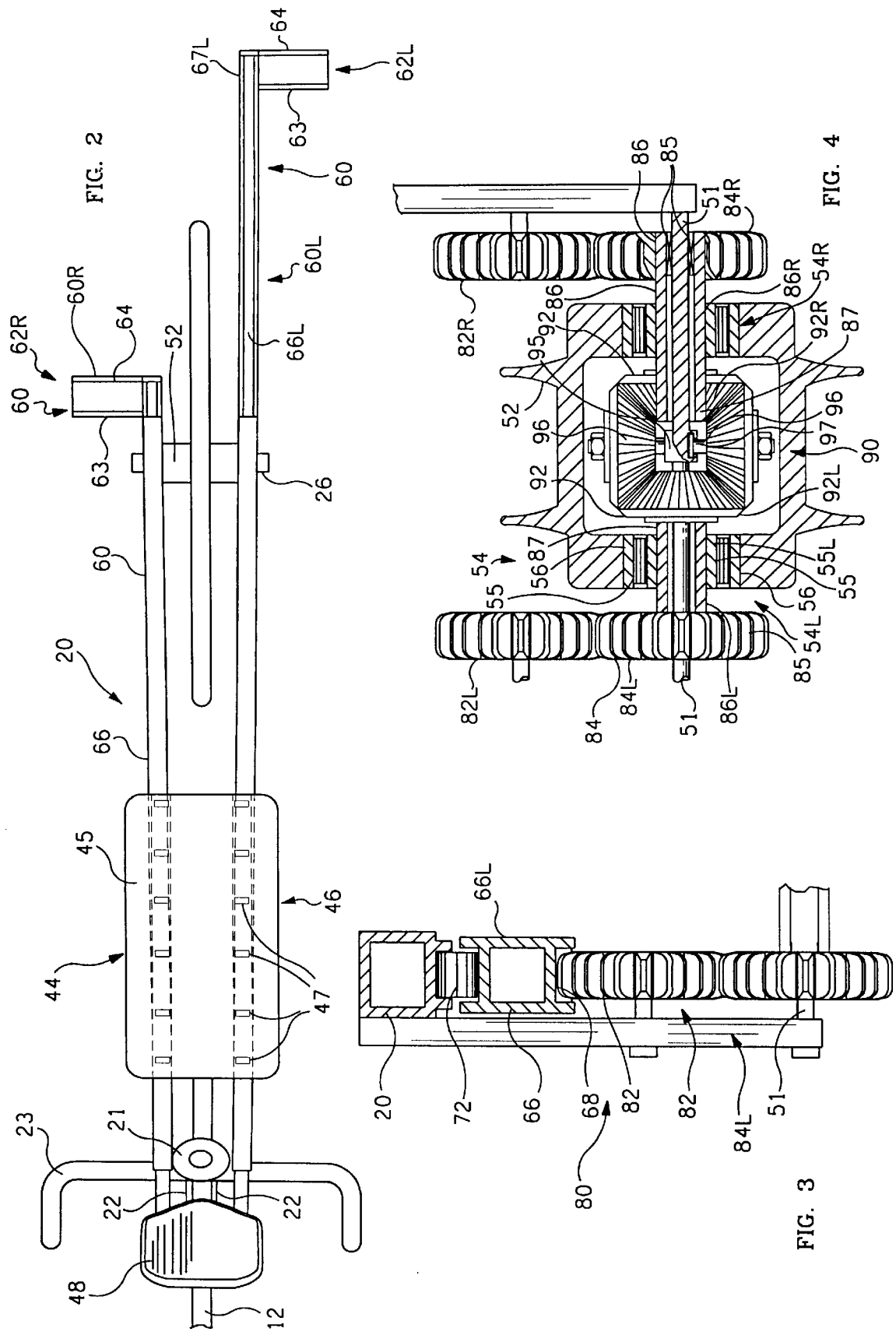

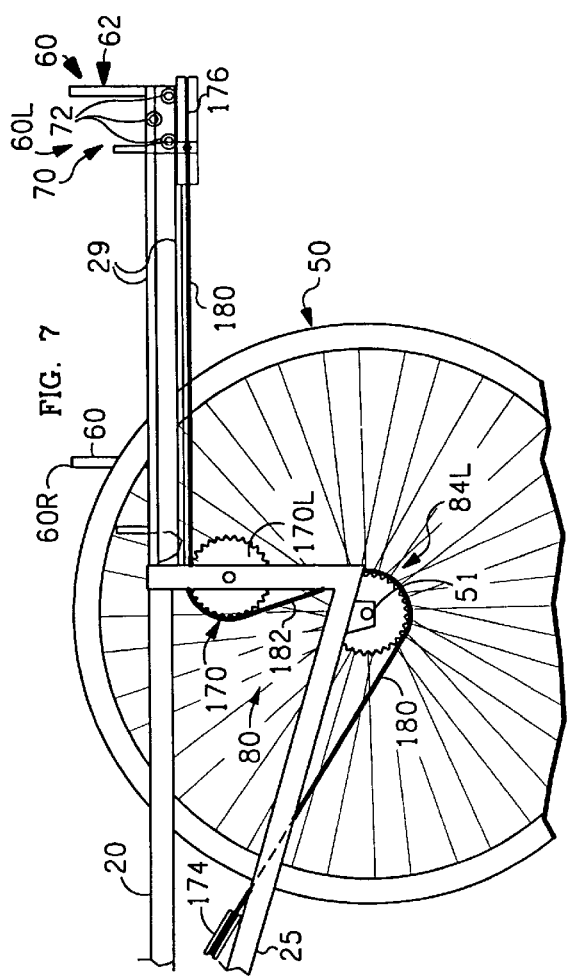
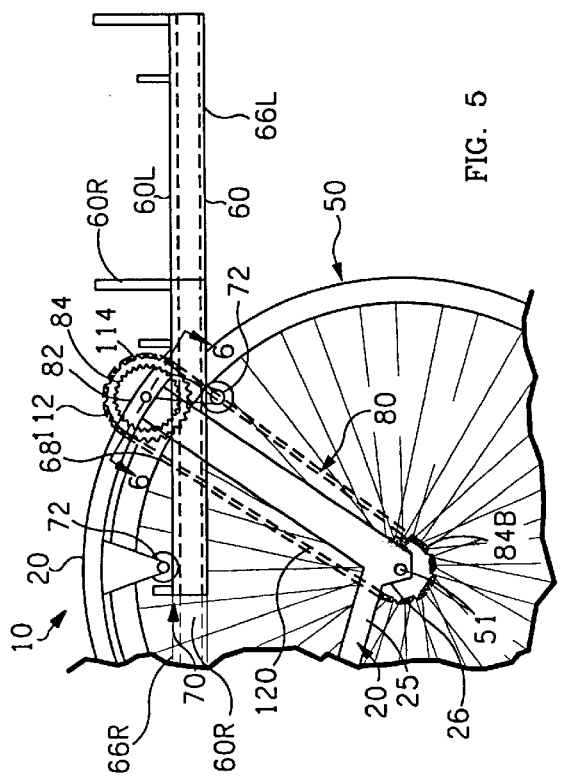
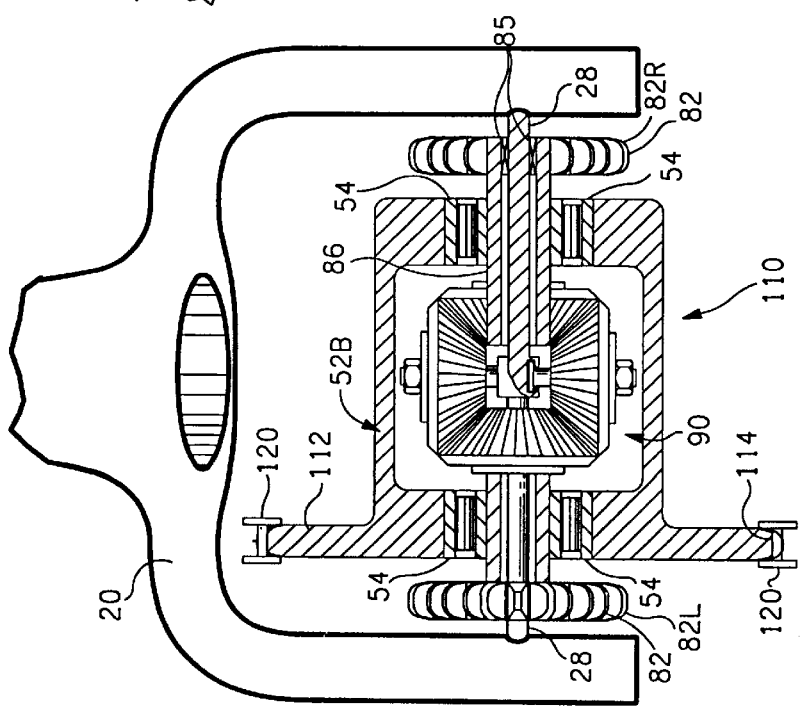

5,915,710

1

HUMAN POWERED VEHICLE

BACKGROUND OF THE INVENTION

1. Field of the Invention

This invention is related to a human powered vehicle and more specifically to a bicycle pedaled by a rider in a substantially horizontal position.

2. Description of the Related Art

Conventional bicycles are powered by the rider sitting above a crank. Bicycles have been proposed having rectilinear pedal movement in the place of a crank, but have not been seen in the marketplace. Several recumbent bicycles have the rider sitting upright with the feet forward for pedaling a crank.

There are several advantages to having a bicycle wherein the rider lies prone including reduced wind resistance, comfort, the negation of gravity which allows blood to easily flow from the heart to the legs and brain, an unrestricted diaphragm which allows full breaths, increased safety due to the short distance the rider falls in an accident and the close proximity of the eyes to the riding terrain which provides a heightened sensation of speed and a fun ride. There are several advantages for the use of rectilinear motion of pedals: the stroke length can be easily varied, the stroke can be dependent or independent and the stroke can power in both directions or forward only or backward only.

Heretofore, no one has created a bicycle taking advantage of these principles

Therefore there has been a need for a bicycle allowing the rider to lie horizontally, face down and providing for rectilinear movement of the pedals.

SUMMARY OF THE INVENTION

This invention is a human powered vehicle and it generally comprises a frame supporting a rider in a substantially horizontal position, a driven wheel rotatably mounted on the frame, a drive gear for driving the driven wheel, left and right pedals mounted on the frame, the pedals reciprocally traveling in a substantially horizontal, rectilinear path, and a transmission connecting each pedal with the driven wheel for converting the rectilinear motion of the pedals into rotary motion for propelling the driven wheel.

In a first exemplary embodiment, each pedal includes rack and each transmission includes a pinion gear engaged with the rack. In a first alternative first embodiment, each pinion gear includes a sprocket which drives a chain connected to the drive gear. In a second alternate first embodiment only a first pinion gear includes a sprocket connected to a chain connected to the drive gear and the second pinion gear is also connected through a differential with the sprocket for driving the sprocket.

In a second exemplary embodiment, a drive belt connects each pedal to the drive gear. The pedals are connected by that drive belt or another belt such that the pedals move simultaneously but in opposite directions.

In a third exemplary embodiment, each pedal is connected by a connecting rod to the crank arm on the crank of a conventional crank driven bicycle.

Other features and many attendant advantages of the invention will become more apparent upon a reading of the following detailed description together with the drawings in which like reference numerals refer to like parts throughout.

2

Figure 1:
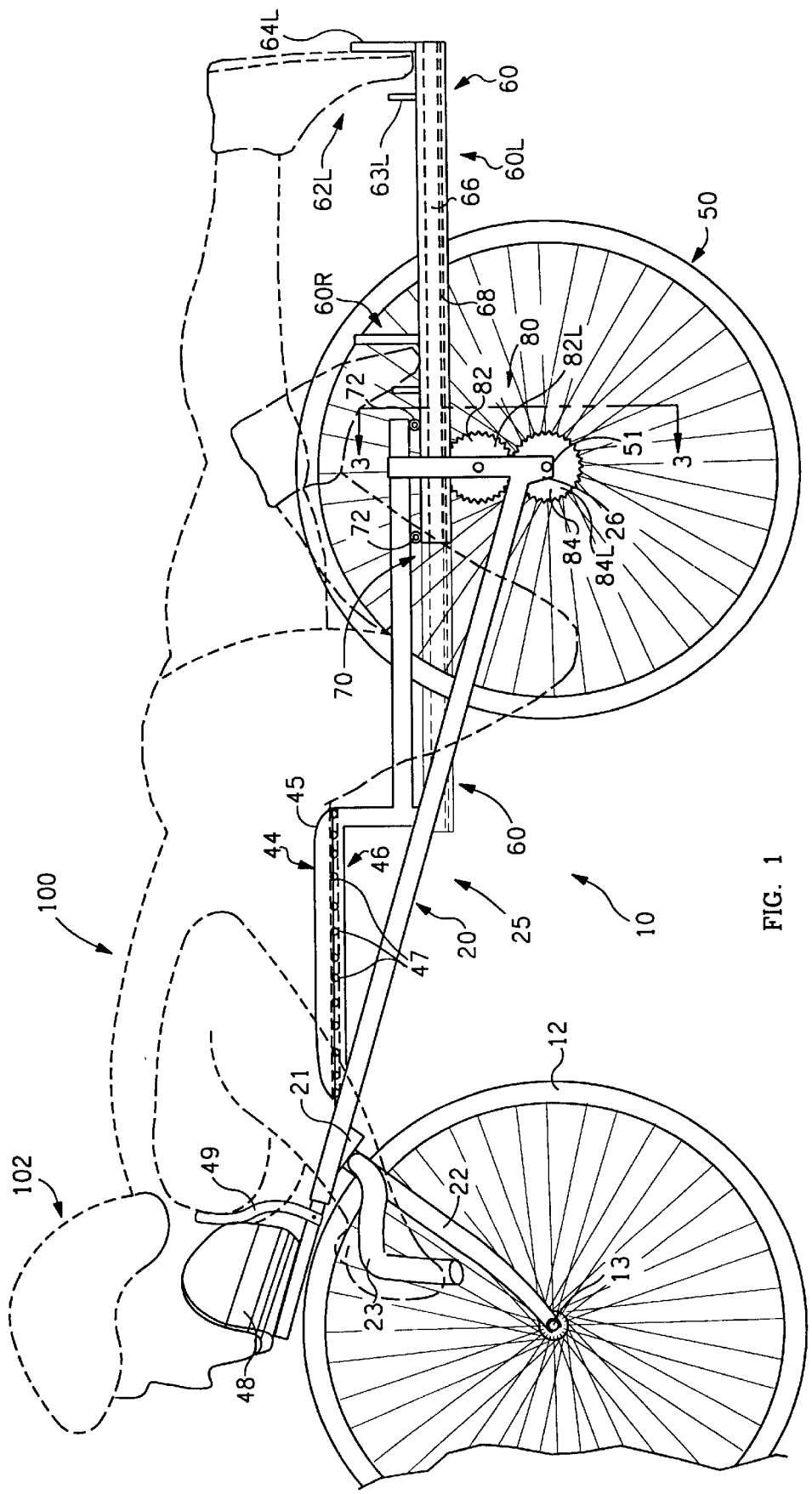
FIG. 1 is a side elevation view of a first preferred embodiment of the vehicle of the invention including a rider, shown in phantom, thereon.

FIG. 2 is a top plan view of the bicycle of FIG. 1 without the rider.

FIG. 3 is an enlarged sectional view taken on line 3—3 of FIG. 1 of the pedal mounting and the drive transmission FIG. 4 is an enlarged view, partially in cross-section, of a preferred embodiment of a differential within the hub of the driven wheel.

FIG. 5 is a side elevation view, partially cut away, of an alternate embodiment of the power transmission means of the first preferred embodiment of the vehicle of FIG. 1.

FIG. 6 is a view, partially in section, of a preferred embodiment of a portion of the power transmission means taken on line 6—6 of FIG. 1.

FIG. 7 is a partial side elevation view of a second preferred embodiment of the vehicle of the invention.

Figure 8:
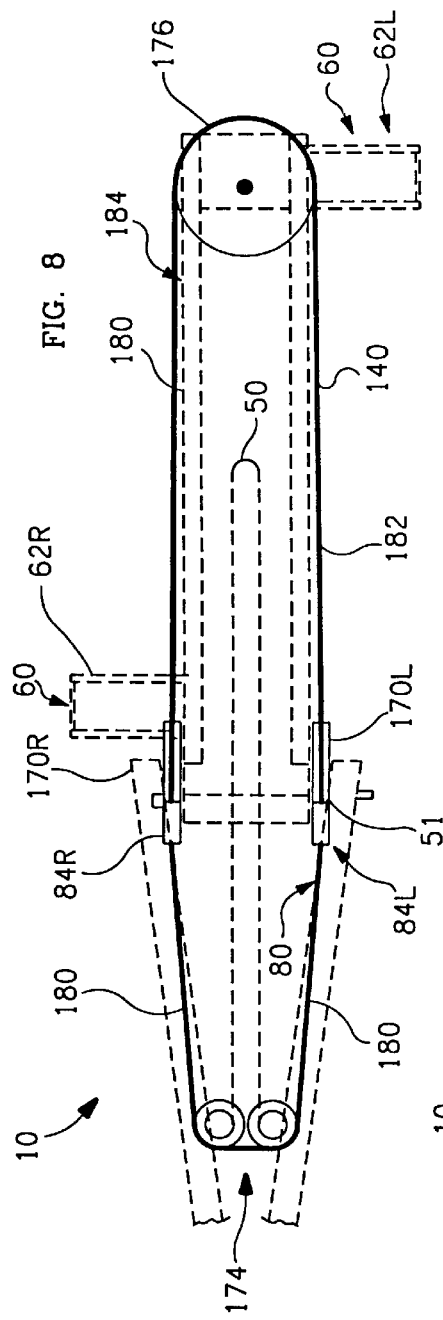

FIG. 8 is a partial top plan view of the power transmission means of the embodiment of FIG. 7.

Figure 9:
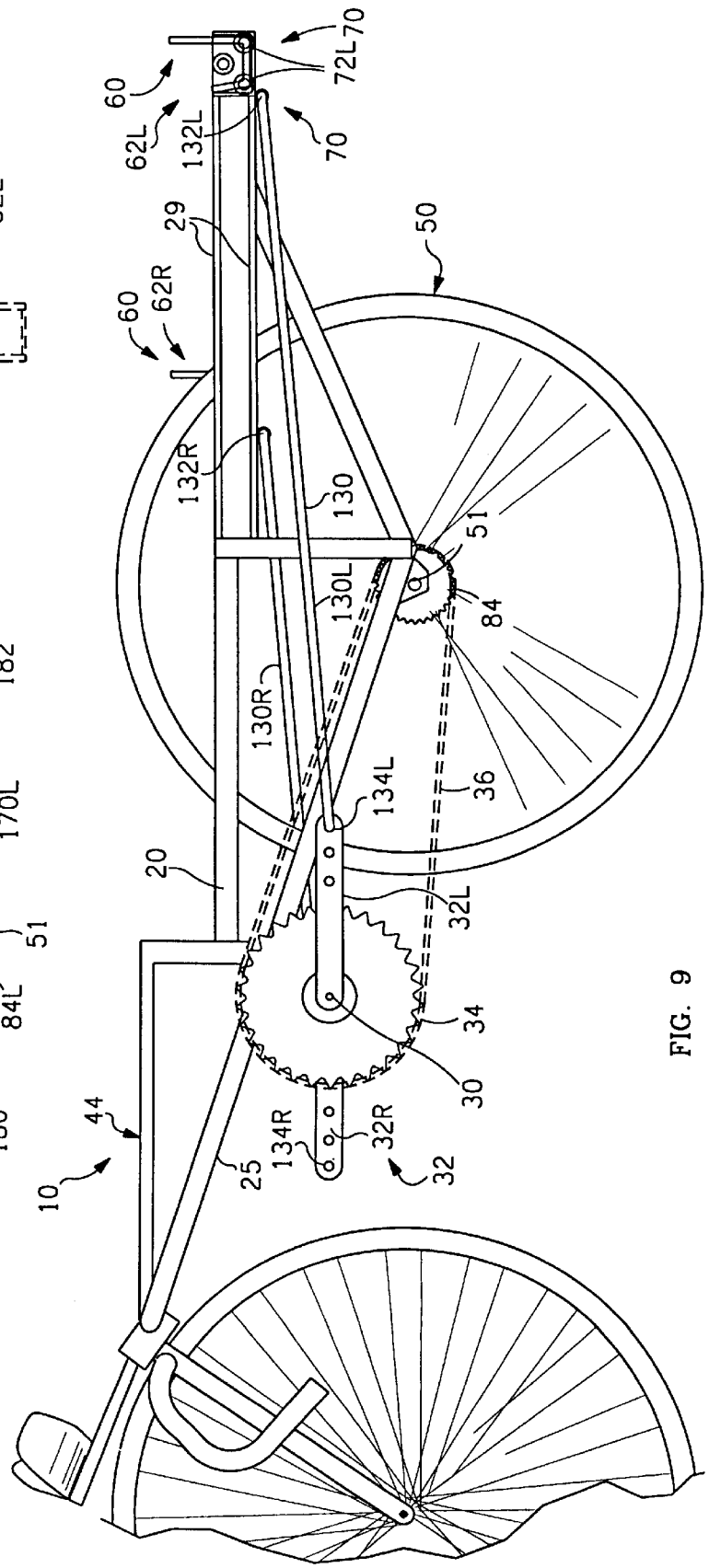

FIG. 9 is a partial side elevation view of a third preferred embodiment of the vehicle of the invention.

DETAILED DESCRIPTION OF THE INVENTION

With reference now to the drawings, FIGS. 1–4 show a first preferred embodiment of the human powered vehicle, such as a bicycle, denoted generally as 10, of the invention FIG. 1 is a side view of bicycle 10 including a rider 100, shown in phantom, thereon. FIG. 2 is a top plan view of bicycle 10 of FIG. 1 without rider 100. Bicycle 10 generally includes a frame 20, a drive wheel or driven wheel, such as rear wheel 50, left and right pedals 60L, 60R, pedal mounting means 70 for mounting pedals 60L,60R to frame 20 and transmission means 80 linking pedals 60L,60R to rear wheel 50. Although a bicycle 10 is shown, it will be appreciated that, in its broadest form, the principles of the invention are applicable to other vehicles having a driven wheel, such as vehicles having three-or more driven wheels or where the driven wheel drives a track or other mobile device.

Frame 20 may be constructed of suitably strong materials as are well-known in the bicycle art, such as aluminum or steel or their alloys or glass or carbon graphite fibers Frame 20 generally includes a front bearing or fork tube 21 in which is journaled a front fork assembly 22. Front fork assembly 22 includes at its upper end a journal or steerer rotatably mounted in fork tube 21. A front wheel 12 is rotatably mounted, such as on front axle 13, to the lower end of front fork assembly 22. Handle bars 23 are attached to the upper end of the front fork assembly 22 for rotating the front fork assembly 22 and front wheel 12 about the axis of fork tube 21, thereby steering bicycle 10 In the preferred embodiment shown, handlebars 23 are attached to front fork assembly 22 below the steering journal.

Frame 20 includes a down tube member, such as down tubes 25, having at its rear end a wheel mount 26 for mounting axle 51 for rear wheel 50 and its front end connected to fork tube 21.

Frame 20 includes head rest 48 for comfortably supporting the rider's head 102 without supporting the rider's chin such that rider 100 can see forward and be able to freely open and close his mouth. Preferably, head rest 48 is padded and easily adjustable to accommodate rider 100. Shoulder braces 49, attached to frame 20, may bear against the rider's shoulders so as to restrain rider 100 from further forward movement.

Frame 20 further includes support means, including chest rest assembly 44 for supporting rider 100 such that rider 100 is supported in a substantially horizontal, face down position. Chest rest assembly 44 includes a chest rest 45 for supporting the chest of rider 100. Chest rest 40 may be contoured to support the rider's chest. Chest rest 45 may be a in fixed position on frame 20 or, as shown, may be slidably mounted with a mount assembly 46 to the remainder of frame 20. Mount assembly includes means, such as on bearings or rollers 47 for rolling supporting chest rest 44 such that it may move from the forward position, shown, rearward to a rear stop position. With this sliding mount 46 for chest rest 45, rider 100 moves a fixed distance backwards and forwards, i.e. longitudinally, by extending and retracting the arms while gripping handle bars 23 or a non-movable part of frame 20.

Rear wheel 50 is generally of conventional construction including a tire mounted on a rim supported by spokes connected to a hub 52 and a free-wheel ratchet bearing 54, as seen in FIG. 4, rotatably supporting said hub 52 as is well known in the art. Ratchet bearing 54 includes an inner race 55 for receiving drive input from transmission means 80 and an outer race 56 connected to hub 52. Inner race 55 is ratchetly connected to outer race 56 such that inner race 55 only drives outer race 56 and hence hub 52 when it is rotating forward, i.e. in the rotational direction of a forward moving wheel, faster than the forward rotation of hub 52. At other times, outer race 56 freely rotates about inner race 55. Ratchet bearing 54 is directly or indirectly connected to frame 20 by rear axle 51.

There are two pedals 60, left pedal 60L and right pedal 60R. Since structure and operation of pedals 60 is identical, except as noted, only the structure and operation of left pedal 60L will be described in detail; the right side being identical.

Left pedal mounting means 70, including left guide rollers 72 and pinion gear 82, connected to frame 20 mount left pedal 60L on frame 20 such that left pedal 60L may reciprocally travel in a substantially horizontal, rectilinear path. Other mounting means 70, such as slides, are contemplated.

Left pedal 60L generally comprises a stirrup means 62, such as left stirrup 62L attached to the rear end 67L of left rack 66L. Left stirrup 62L receives the rider's left foot such that forward and rearward pressure exerted by the rider's left foot on left stirrup 62L moves left pedal 60L forward and rearward. Left stirrup 62L, shown, includes a left front plate 63L and a left rear plate 64L Both stirrup plates 63L,64L are lateral and both project upward for receiving therebetween the tip of the rider's foot. Stirrups 62 of other construction are contemplated For example, stirrup 62 may be a circular collar, a strap or a clipless pedal.

Turning now also to FIG. 3, there is shown an enlarged sectional view taken on line 3—3 of FIG. 1 of left rack 66L and drive transmission means 80. Left rack 66L is an elongate bar having a top rollingly supported and guided by left guide rollers 72L and having a bottom supported by left pinion gear 82L. The bottom of left rack 66L includes teeth 68 engaged with the teeth 84 of pinion gear 82L such that forward and rearward movement of left rack 66L rotates left pinion gear 82L. Right pedal 60R rotates a right pinion gear in identical manner.

Transmission means 80, linking pedal 60 and drive wheel 50 and driven by pedal 60, converts the rectilinear motion of pedal 60 into rotary motion for propelling drive wheel 60. In its simplest form, transmission means 80 includes pinion gear 82 and drive gear 84. As in common in the art, drive gear 84 may be rotatably mounted on axle 51, connected to rear wheel hub 52, such as by drive shaft 85 mounted on inner race 55 of ratchet bearing 54, and, when forwardly rotated by pinion gear 82, rotate rear wheel 50. Also, as is well-known in the art, various shifting devices, including an internally shifting hub, can be used to connect drive gear 84 and hub 52 to vary the mechanical advantage between the two, i.e. to vary speed between the two.

Turning now also to FIG. 4 there is shown, partially in cross-section, an enlarged view of additional elements of a preferred embodiment of transmission means 80. Transmission means 80 of FIG. 4 is the same as that described above except it further includes a differential or torque reverser 90 for coupling drive gears 84 such that they must rotate in opposite directions Torque reverser 90 connects the inner ends 87 of left and right drive shafts 86. Left and right drive gears 84L,84R are rotatably mounted relative to frame 20 such as by bearing 85 on rear axle 51. Each drive gear 84 includes a drive shaft 86 projecting toward the center of hub 52. Each drive shaft 86L,86R has an associated ratchet bearing 54L,54R and contacts inner race 55L,55R of its ratchet bearing 54L,54R for propelling hub 52. The inner ends 87 of drive shafts 86L,86R are connected through a torque reverser 90. Torque reverser 90 reverses the direction of torque transmission between drive shafts 86L,86R. Inner ends 87 of drive shafts 86L,86R each are connected to a side gear 92L,92R. Center block 96 is fixedly attached to axle 51. One or more planetary or connecting gears 96, rotatably mounted, such as by flanged shaft 97, to center block 95, connect side gears 92 so as to reverse the direction of rotation to the other side gear 92. Forward rotation of left drive gear 84L and left drive shaft 86L forwardly drives wheel 50 through ratchet bearing 54L and acts through torque reverser 90 to rearwardly rotate right drive shaft 86R and right drive gear 86R. Conversely, rearward rotation of left drive gear 84L and left drive shaft 86L acts through torque reverser 90 to forwardly rotate right drive shaft 86R and right drive gear 86R and right drive shaft 86R acts through right ratchet bearing 54R to forwardly drive wheel 50. Thus, with torque reverser 90, pedals 60 are coupled and move in opposite directions Again, various shifting devices, including an internally shifting hub, can connect drive gear 84 and hub 52 to vary the mechanical advantage between the two, i.e. to vary speed between the two.

FIG. 5 is a side elevation view, partially cut away, of an alternate embodiment of the transmission means 80 of the first preferred embodiment of FIG. 1. FIG. 6 is a view, partially in section, taken on line 6—6 of FIG. 1. Other than the differences noted here, the components of the embodiment of FIG. 5 are the same as described above. Also, as above, the left side will be described, the right side being identical Pedal mounting means 70, including guide rollers 72 and pinion gear 82, are connected to frame 20. Left pedal 60L mounts on frame 20 such that left pedal 60L may reciprocally travel in a substantially horizontal, rectilinear path. Other forms of mounting means 70, such as slides, are contemplated Teeth 68 of left rack 66L of left pedal 60L are upward facing and engage left pinion gear 82L which is rotatably mounted on pinion axle 28 of frame 20 such that left pinion gear 82L rotates forward and rearward with movement of pedal 60L.

As best seen in FIG. 6, each pinion gear 82 is connected to a top sprocket hub assembly 110. Sprocket hub assembly 110 is very similar to the device of FIG. 4 with pinion gears 82 as drive gears 84 and includes a torque reverser 90 and a sprocket hub 52B. Top sprocket hub 52B differs from rear wheel hub 52 in that, instead of supporting and turning a drive wheel, top sprocket hub 52B supports and turns a top sprocket 112. Sprocket hub assembly functions in the same manner as the assembly shown and described in FIG. 4 and in this manner top sprocket 112 is forwardly rotated. Again, various shifting devices, including an internally shifting hub, can be used between pinion gear 82 and hub 52B to vary the mechanical advantage between the two, i.e. to vary speed between the two.

Further included in the transmission means 80 of the embodiments of FIGS. 5 and 6 are chain 120 and drive gear 84. Top sprocket 112 includes means, such as teeth 114, for engaging and driving a flexible tension member, such as continuous chain 120. Chain 120 engages and drives means, such as drive sprocket 84B, for driving rear wheel 50. This chain drive allows the use of shifting devices, such as a conventional derailleur. For example, drive sprocket 84B may include a plurality of drive sprockets of various sizes and a derailleur may be used to move chain 120 between the drive sprockets. Alternatively, an internal shifter could be incorporated into rear wheel hub 52.

FIGS. 7 and 8 show a second preferred embodiment of the invention. FIG. 7 is a partial side elevation view and FIG. 8 is a partial top plan view of the power transmission means of the embodiment of FIG. 7.

Frame 20 includes track means, such as a C-channel or a pair of rods 29, on each side for supporting and guiding pedals 60. Pedal mounting means 70, including guide rollers 72 attached to pedals 60, mount pedals 60 on rods 29 such that pedals 60 may reciprocally travel in a substantially horizontal, rectilinear path. Each pedal 60 includes a stirrup 62 as previously described.

Transmission means 80 includes drive means for connecting pedals 60 to rear wheel 50 for driving rear wheel 50 and pedal connecting means for connecting pedals 60 such that they must move simultaneously in opposite directions.

Transmission drive means includes left and right drive gears, sprockets or pulleys 84L, 84R rotatably mounted on frame 20 and operating to drive rear wheel 50 in a manner as described with respect to FIG. 1 or FIG. 4. A continuous flexible tension member, such as a chain, cable or belt 180 connects pedals 60. Belt 180 includes a drive portion 182 and a pedal connecting portion 184. Belt drive portion 182 and pedal connection portion 184 may constitute different portions of a single belt or may be two or more belts each connected to pedals 60. Belt drive portion 182 connects pedals 60 to drive pulleys 84 such that rearward movement of left pedal 60L forwardly rotates left drive pulley 84L and forwardly moves right pedal 60R and such that rearward movement of right pedal 60L forwardly rotates right drive pulley 84R and forwardly moves left pedal 60L. A pair of top pulleys 170, such as Left and right top pulleys 170L, 170R, are rotatably mounted on frame 20 above drive pulleys 84 such that belt 180 passing thereover moves linearly with pedal movement. Belt 180 is connected to stirrups 62, mounts over top pulleys 170, then around and under drive pulleys 84 and forward and around front reversing pulley or pulleys 174 which are rotatably mounted on frame 20. Transmission pedal connection means includes belt pedal connecting portion 184 connecting pedals 60 and rear reversing pulley 176. Belt pedal connecting portion 184 includes front ends connected to pedals 60L, 60R and a mid-section mounted on rear reversing pulley 176 such that forward movement of left pedal 60L rearwardly moves right pedal 60R and such that forward movement of right pedal 60R rearwardly moves left pedal 60L.

Pulleys 170, 176 are mounted such that belts 182,184 move linearly with respect to movement of pedals 60 such that belts 182,184 in effect form a continuous loop.

There are many variations to the drive principles expressed in reference to FIGS. 6 and 7. For example, three belts may be used. Pedals 60 may be connected to a horizontal oval belt having a front and a rear reversing pulley such that pedals 60 move simultaneously in opposite directions. Then, each pedal may be connected to its own substantially vertical loop belt that drives its respective drive gear.

FIG. 9 is a partial side elevation view of a third preferred embodiment of the vehicle 10 of the invention. Vehicle 10 has a conventional bicycle drive including front crank 30 rotatably mounted on frame 20, crank arms 32, such as left crank arm 32L and right crank arm 32R, for turning crank 30, front drive sprocket 34 connected to crank 30 and rotated therewith, rear sprocket 84 and power conveying means, such as a continuous flexible tension member, such as chain 36, connecting sprockets 34,84. Shifting means, not shown, utilized for conventional drive systems may be incorporated.

Pedals 60 mount as described above. Frame 20 includes track means, such as a C-channel or a pair of rods 29, on each side for supporting and guiding pedals 60. Pedal mounting means 70, including guide rollers 72 attached to pedals 60, mount pedals 60 on rods 29 such that pedals 60 may reciprocally travel in a substantially horizontal, rectilinear path. Each pedal 60 includes a stirrup 62 as previously described.

Connecting rods 130, such as left and right connecting rods 130L,130R, each has a rear end 132L, 132R hingedly connected to its respective pedal 62L,62R and a front end 134L,134R rotatably connected to its respective crank arm 32L,32R. Means, such as multiple mounting holes 33 in crank arms 32L,32R, allow front ends 134L,134r of connecting rods 130L,130R to connect to crank arms 32 at various distances from crank 30 so as to vary the stroke length of pedals 60. Connecting rods 130 may be of varying lengths to adjust to the height of the rider.

Having described the invention, it can be seen that it provides a very convenient device for driving a vehicle. For clarity of illustration and discussion, many conventional elements of a bicycle have been omitted, such as brakes and shifting mechanisms and it is contemplated to incorporate these in with the teachings of the invention as is appropriate.

Although a particular embodiment of the invention has been illustrated and described, various changes may be made in the form, composition, construction, and arrangement of the parts without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. A vehicle powered by a rider comprising:
   a frame;
   a driven wheel rotatably mounted on said frames when driven for propelling said frame;
   a first pedal;
   first pedal mounting means for mounting said first pedal on said frame such that said first pedal may reciprocally travel in a rectilinear path;
   first transmission means connected between said first pedal and said driven wheel and driven by said first pedal for converting the rectilinear motion of said first pedal into rotary motion for propelling said driven wheel; and a head support mounted on said frame for supporting the head of the rider.

2. The vehicle of claim 1 wherein: said frame further includes:
 a sliding mount assembly connecting said chest rest to the remainder of said frame such that said chest rest may reciprocate longitudinally while supporting the chest of the rider.

3. The vehicle of claim 1 wherein:
 said head support supports the head of the rider without supporting the rider's chin such that the rider may freely open and close his mouth.

4. The vehicle of claim 1 wherein: said first pedal includes:
 stirrup means for receiving the rider's foot for moving said pedal forward and rearward in response to pressure exerted thereon by the rider's foot.

5. The vehicle of claim 1 wherein: said first pedal includes:
 stirrup means for receiving the rider's foot for moving said first pedal forward and rearward in response to pressure exerted thereon by the rider's foot; and
 a rack; and said first transmission means includes:
 a pinion gear engaged with said rack.

6. The vehicle of claim 1 wherein: said first pedal includes:
 a rack; and said first transmission means includes:
 a pinion gear engaged with said rack.

7. The vehicle of claim 1 wherein: said frame further includes:
 a chest rest for supporting the chest of the rider.

8. A vehicle powered by a rider comprising:
 a frame;
 a driven wheel rotatable mounted on said frame, when driven for propelling said frame;
 a first pedal including:
  a rack;
 first pedal mounting means for mounting said first pedal on said frame such that said first pedal may reciprocally travel in a rectilinear path; and
 first transmission means connected between said first pedal and said driven wheel and driven by said first pedal for converting the rectilinear motion of said first pedal into rotary motion for propelling said driven wheel; said first transmission means including:
  a pinion gear engaged with said rack; and
  a drive gear rotatably mounted on said frame and connected to said driven wheel and to said pinion gear for driving said driven wheel in response to rotation of said pinion gear, wherein: said drive gear engages said pinion gear and is directly driven therefrom.

9. The vehicle of claim 8 wherein: said frame further includes:
 a chest rest for supporting the chest of the rider.

10. The vehicle of claim 8 further including:
 a head support mounted on said frame for supporting the head of the rider.

11. A vehicle powered by a rider comprising:
 a frame;
 a driven wheel rotatable mounted on said frame, when driven for propelling said frame;
 a first pedal including:
  a rack;
 first pedal mounting means for mounting said first pedal on said frame such that said first pedal may reciprocally travel in a rectilinear path; and
 first transmission means connected between said first pedal and said driven wheel and driven by said first pedal for converting the rectilinear motion of said first pedal into rotary motion for propelling said driven wheel; said first transmission means including:
  a pinion gear engaged with said rack of said first pedal;
 a second pedal including:
  a rack,
 second pedal mounting means for mounting said second pedal on said frame such that said second pedal may reciprocally travel in a rectilinear path; and
 second transmission means connected between said second pedal and said driven wheel and driven by said second pedal for converting the rectilinear motion of said second pedal into rotary motion for propelling said driven wheel; said second transmission means including:
  a pinion gear engaged with said rack of said second pedal; wherein:
 said first transmission means includes:
  a drive gear rotatably mounted on said frame and connected to said driven wheel and engaged with said pinion gear of said first transmission means and directly driven thereby for driving said driven wheel; and
 said second transmission means includes:
  a drive gear rotatably mounted on said frame and connected to said driven wheel and engaged with said pinion gear of said second transmission means and directly driven thereby for driving said driven wheel.

12. The vehicle of claim 11 including:
 torque reverser means connecting said drive gears of said first and second transmission means for transferring a torque from one said drive gear to the other; each said drive gear transferring torque tending to turn the other said drive gear in the opposite direction.

13. The vehicle of claim 12 wherein: said frame further includes:
 a chest rest for supporting the chest of the rider.

14. The vehicle of claim 12 further including:
 a head support mounted on said frame for supporting the head of the rider.

15. A vehicle powered by a rider comprising:
 a frame;
 a driven wheel rotatably mounted on said frame, when driven for propelling said frame;
 a first pedal including:
  a rack;
 first pedal mounting means for mounting said first pedal on said frame such that said first pedal may reciprocally travel in a rectilinear path; and
 first transmission means connected between said first pedal and said driven wheel and driven by said first pedal for converting the rectilinear motion of said first pedal into rotary motion for propelling said driven wheel; said first transmission means including:
  a pinion gear engaged with said rack of said first pedal;
 a second pedal including:
  a rack;
 second pedal mounting means for mounting said second pedal on said frame such that said second pedal may reciprocally travel in a rectilinear path; and second transmission means connected between said second pedal and said driven wheel and driven by said second pedal for converting the rectilinear motion of said second pedal into rotary motion for propelling said driven wheel; said second transmission means including:
  a pinion gear engaged with said rack of said second pedal; wherein:
said pinion gear of said first transmission means includes:
  a sprocket;
said first transmission means includes:
  a drive gear rotatably mounted on said frame and connected to said driven wheel for driving said driven wheel; and
  a flexible tension member connecting said pinion gear of said first transmission means and said drive gear of said first transmission means for rotating said drive gear of said first transmission means in response to rotation of said pinion gear of said first transmission means;
said pinion gear of said second transmission means includes:
  a sprocket; and
said second transmission means includes:
  a drive gear rotatably mounted on said frame and connected to said driven wheel for driving said driven wheel; and
  a flexible tension member connecting said pinion gear of said second transmission means and said drive gear of said second transmission means for rotating said drive gear of said second transmission means in response to rotation of said pinion gear of said second transmission means.

16. The vehicle of claim 15 wherein: said frame further includes:
  a chest rest for supporting the chest of the rider.

17. The vehicle of claim 15 further including:
  a head support mounted on said frame for supporting the head of the rider.

18. A vehicle powered by a rider comprising:
  a frame;
  a driven wheel rotatable mounted on said frame, when driven for propelling said frame;
  a first pedal;
  first pedal mounting means for mounting said first pedal on said frame such that said first pedal may reciprocally travel in a rectilinear path; and
  first transmission means connected between said first pedal and said driven wheel and driven by said first pedal for converting the rectilinear motion of said first pedal into rotary motion for propelling said driven wheel; wherein
said first transmission means includes:
  a drive gear rotatably mounted on said frame and connected to said driven wheel for driving said driven wheel; and
  drive member means including a flexible tension member connected to said first pedal and to said drive gear such that movement of said first pedal in a first direction forwardly rotates said drive gear and such that movement of said first pedal in the second direction rearwardly rotates said drive gear; and further including:
  a second pedal;
  second pedal mounting means connected to said frame for mounting said second pedal on said frame such that said second pedal may reciprocally travel in a rectilinear path; and
  pedal connection means including a flexible tension member connecting said first and said second pedals such that movement of said first pedal in a first direction moves said second pedal in the opposite direction and such that movement of said second pedal in the first direction moves said first pedal in the opposite direction.

19. The vehicle of claim 18 wherein: said frame further includes:
  a chest rest for supporting the chest of the rider.

20. The vehicle of claim 19 further including:
  a head support mounted on said frame for supporting the head of the rider.

* * * * *